United States Patent [19]
Warshauer et al.

[11] 3,757,671
[45] Sept. 11, 1973

[54] FOOD PREPARATION UNIT

[75] Inventors: Martin Warshauer, Fair Haven; Harold Sher, Rumson, both of N.J.

[73] Assignee: Electric Char-B-Que, Inc., Red Bank, N.J.

[22] Filed: Oct. 30, 1972

[21] Appl. No.: 302,080

[52] U.S. Cl............... 99/400, 99/401, 99/446, 99/447, 219/400, 219/448, 219/461, 219/524
[51] Int. Cl. ............................................. A47j 37/06
[58] Field of Search.................. 219/399, 400, 445, 219/446, 447, 448, 449, 455, 460, 461, 521, 524, 525; 99/400, 401, 446, 447

[56] References Cited
UNITED STATES PATENTS

| 3,095,495 | 6/1963 | Gvozdjak et al. | 219/460 X |
| 3,154,004 | 10/1964 | Huck | 99/400 X |
| 3,393,295 | 7/1968 | Jepson et al. | 219/524 X |
| 3,350,543 | 10/1967 | Berger et al. | 219/447 |
| 3,487,199 | 12/1969 | Hamlin | 219/399 |
| 3,490,359 | 1/1970 | Seitz | 99/400 |
| 3,527,154 | 9/1970 | Shaper et al. | 99/400 |
| 3,552,301 | 1/1971 | McNeff | 99/446 X |

Primary Examiner—Volodymyr Y. Mayewsky
Attorney—Revis Gale Rhodes, Jr.

[57] ABSTRACT

A food preparation unit including a base having a contoured bottom with an aperture formed therein to provide an air intake and to permit the drainage of fat from the unit, a cover hinged to the base and provided with an adjustable vent formed in the top thereof for permitting the escape of steam and smoke from the unit, the adjustable vent including an aperture for assuring an ever present opening to permit the escape of excess smoke and steam from the unit; and the elements contained within the grill, such as a support grill and drip pan assembly, being supported within the unit so as to be spaced from the walls of the unit so as to permit an intake of air in the aperture formed in the base of the unit and a flow of air upwardly through the unit along the walls thereof and out the vent so as to cool the bottom of the unit and purge smoke from the unit.

13 Claims, 10 Drawing Figures

Patented Sept. 11, 1973  3,757,671

PRESENT INVENTION

FOOD PREPARATION UNIT

BACKGROUND OF THE INVENTION

This invention relates to food preparation units, e.g. roasters, smokers, food warmer or oven, in general, and in particular relates to electric grills for indoor and outdoor use. Various electric grills are known to the prior art, for example, the portable electric cooker shown and described in U.S. Pat. No. 3,487,199 issued Dec. 30, 1969. Various problems have persisted and perplexed the food preparation unit and electric grill art, more specifically, it is generally desired that such units be able to reside on table tops, or other surfaces susceptible to burning or charring, during cooking which requires that the bottom of the unit be kept comparatively cool with respect to the temperature of the heating element of the grill. This problem has been approached by the provision of a layer of heat insulation which brings unwanted cost and the attendant problem of fat becoming intermixed with the insulation and becoming rancid. Still further, the prior art food preparation units or electric grills typically provide no means for permitting the escape of dripping fat from the grill and hence the fat accumulates in the bottom of the grill and becomes rancid.

SUMMARY OF THE INVENTION

The food preparation unit of the present invention overcomes the above-noted prior art problems and also provides improved cooking and heating. More particularly, the food preparation unit of the present invention includes an adjustable vent formed in the cover of the unit which includes an aperture for assuring an ever present opening to permit the escape of excess steam and smoke which may accumulate in the unit. In addition, the food preparation unit of the present invention is provided with a base having a contoured bottom provided with an aperture for providing an air intake and for permitting the drainage of fat from the unit. Still further, the present invention provides a flow of air which enters the aperture formed in the base of the unit and which flows upwardly along the walls of the unit and out the vent thereby cooling the bottom of the unit with respect to the temperature of the heating element, purging smoke from within the unit, and creating a convection current.

DETAILED DESCRIPTION OF THE INVENTION

Figure 1:
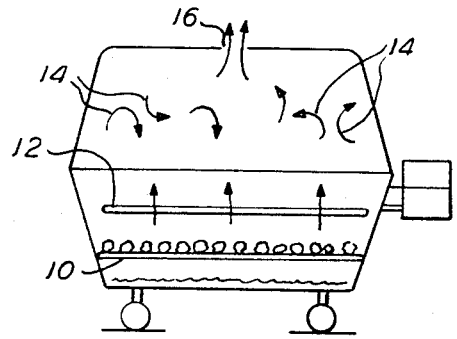
FIG. 1 is a diagrammatic representation showing a typical prior art electric grill.
Figure 2:
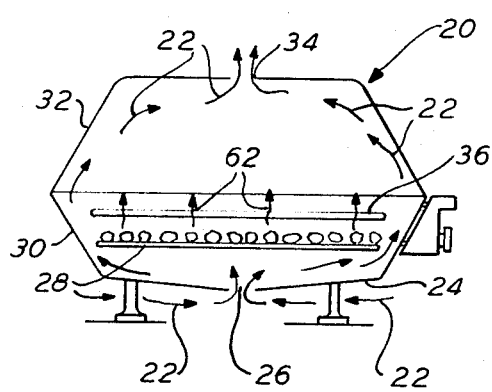
FIG. 2 is a diagrammatic representation of the food preparation unit of the present invention.

Referring now to FIGS. 1 and 2, there are respectively shown diagrammatic representations of a typical prior art electric grill and the food preparation unit of the present invention. With particular regard to the typical prior art electric grill of FIG. 1, upon electrical energy being supplied to a heating element 10, for example, to heat and cook meat residing on the cooking grill 12, air within the grill is heated and provided with a turbulent flow as indicated by the arrows 14, and, smoke produced by cooking the meat is undesirably entrapped by the turbulent air flow and hence only a relatively small portion of the smoke is permitted to escape through the vent 16. Comparatively, as shown in FIG. 2, substantially all the smoke is purged from the food preparation unit 20 of the present invention by a relatively laminar and continuous flow of air indicated by the arrows 22. The contoured bottom 24 of the unit 20 is provided with an aperture 26 and upon electrical energy being applied to the heating element 28, ambient air indicated by the arrows 22 is drawn upwardly through the aperture 26 and caused to flow along the walls of the base 30 and cover 32 and out the vent 34 to substantially completely purge the unit of smoke produced by cooking, for example, meat residing upon the grill 36. Such flow of air 22, as taught in detail infra, is promoted by supporting the internal elements of the food preparation unit 20 in such a manner that they are spaced from the walls of the base 30 a predetermined distance thereby permitting air flow 22 between the internal elements and the walls of the base 30.

Further, since such food preparation units must be maintained by a table top, the bottom or base of the unit must be maintained at a temperature considerably lower than the temperature of the heating element as required for cooking or else the table top, and items residing thereon such as a table cloth, will be burned, charred, or undesirably heated. In the prior art electric grill of FIG. 1, the bottom or base of the grill is maintained at a lower temperature by a layer of insulation 17, such as perlite, packed under a covering layer of foil. Such layer of insulation adds undesirable cost to the grill, and, upon the foil being punctured or burned through by dripping fat (a common occurrence), the insulation will collect the dripping fat which goes rancid and imparts an excessive and highly undesirable taste to food cooked on the grill. However, such problem and additional cost associated with such layer of insulation is obviated in the food preparation unit of the present invention by being eliminated as indicated in FIG. 2. The bottom or base 24 is maintained at a desirably cool temperature, considerably lower than the temperature of the heating element 28 while cooking meat, for example, by the constant intake of cool ambient air 22 which flows along the contoured bottom of the base 24 thereby cooling the contoured bottom sufficiently to permit placement of the unit 20 on a table top without harm to the table top or any items residing thereon such as a table cloth.

Still further, as indicated by FIGS. 1 and 2, the heating element 28 of the food preparation unit of the present invention is positioned closer to the grill 36 than the corresponding elements of the prior art grill thereby providing more uniform and higher temperature cooking for the same electrical energy input, and also provides better fat burn-off.

Additional advantages of the present invention over the prior art are set below in the detailed description of the food preparation unit 20 embodying the present invention and illustrated in detail in FIGS. 3-8.

Figure 3:
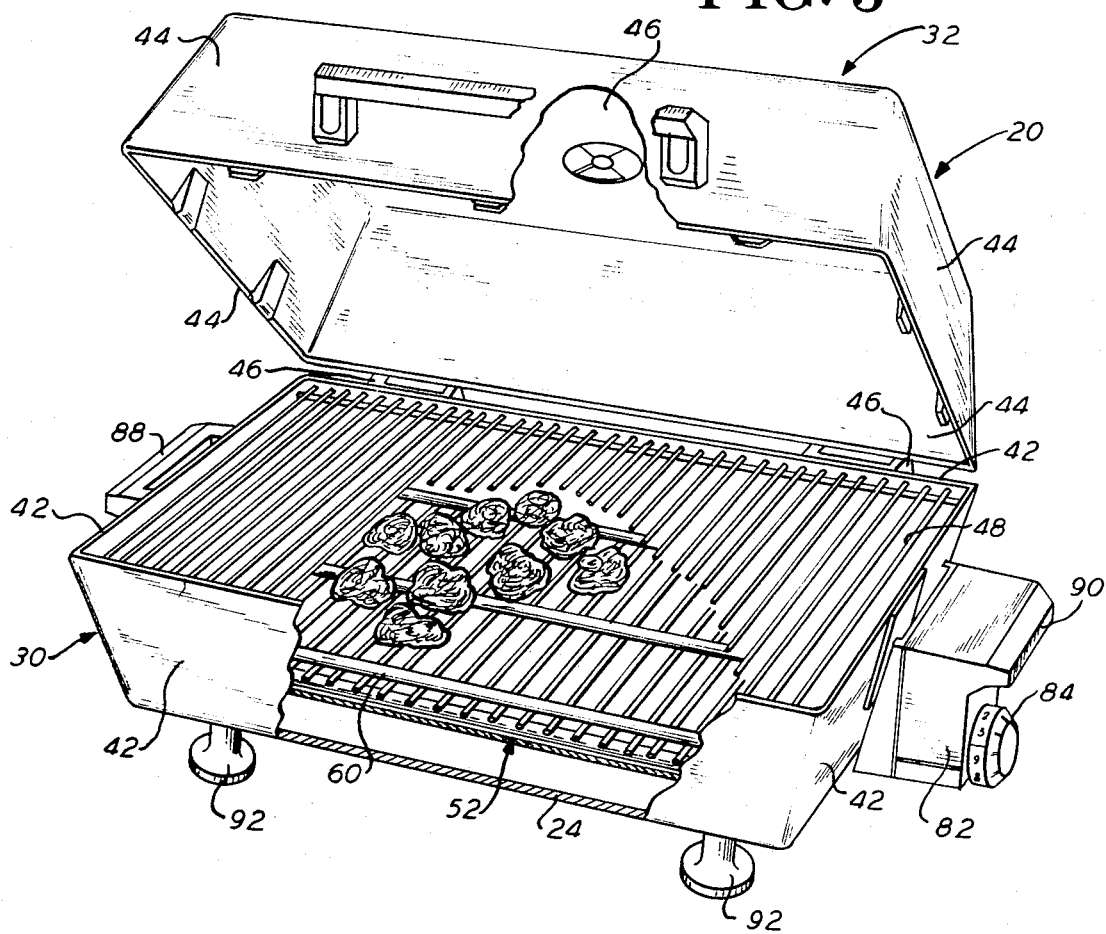
FIG. 3 is a perspective view of the food preparation unit of the present invention with parts broken away to show various features of the present invention.
Figure 5:
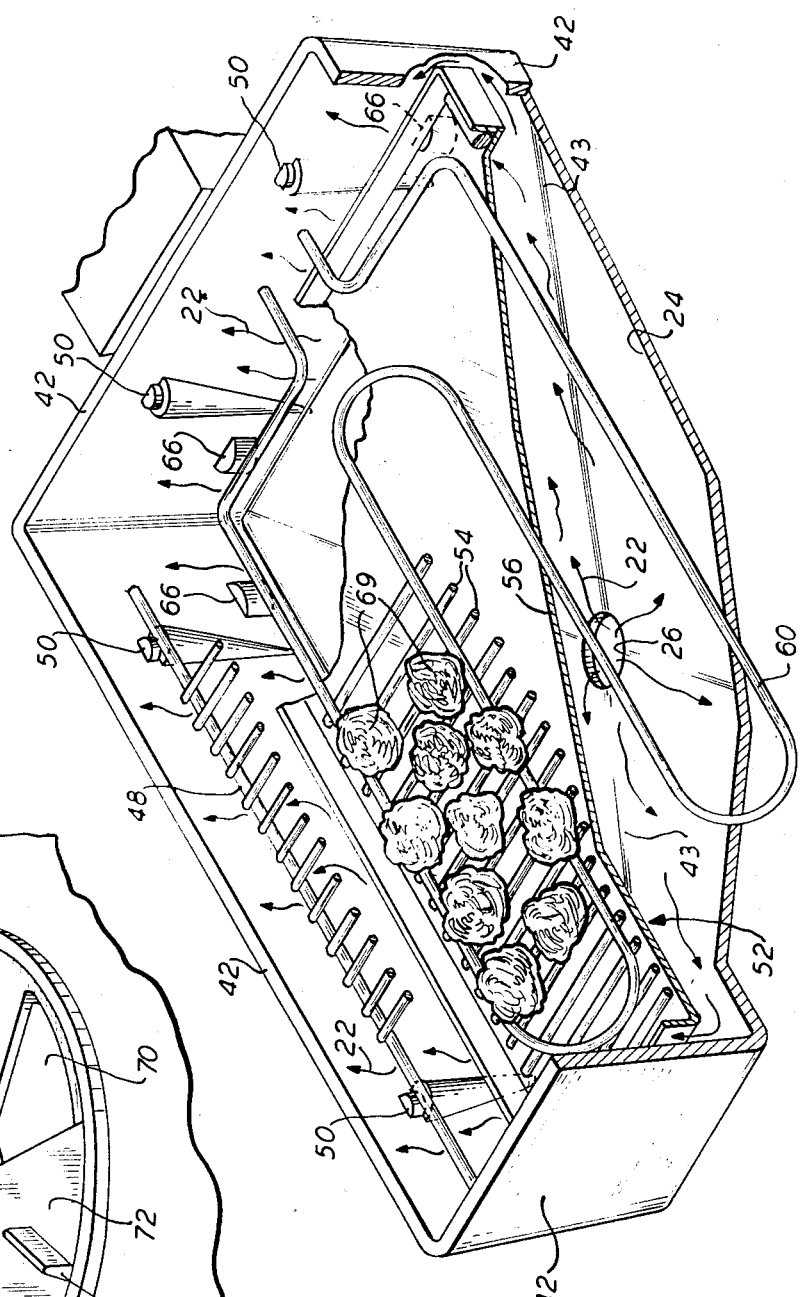
FIG. 5 is a partial view of the base of the food preparation unit and having parts broken away to better illustrate structural features of the unit.

Referring now to FIGS. 3 and 5, the food preparation unit 20 includes a base 30 having four walls 42—42 inclined at a predetermined angle (e.g. 12°) with respect to the vertical, and a contoured bottom 24 formed integrally with the walls 42—42; the contour of the bottom 24 being illustrated in FIG. 2 and indicated in FIG. 5 by the formation or contour lines 43. The food preparation unit 20 further includes a cover 32 having four walls 44—44 also inclined at a predetermined angle with respect to the vertical (e.g. 12°), and a top 46 formed integrally with the walls 44—44.

For opening and closing of the unit 20, the cover 32 may be pivotally secured to the base 30 such as by limited pivoting, hinge means 47 which are described in detail infra.

A suitable grill 48, useful for example as a food receiving and supporting grill, a cooking grill, or a grill for supporting a food warmer, is included and such grill is supported at a predetermined height with respect to the bottom 24, for example, by a plurality of bosses 50—50 which may be formed integrally at predetermined points and at a predetermined height along the walls 42—42 of the base 30.

Also provided is a support grill and drip pan assembly 52 which includes a support grill 54 and a drip pan 56 suitably secured together as an integral unit or assembly, such as for example, by wrapping opposed edges of the drip pan around corresponding opposing edges of the support grill 54 to mechanically interlock such elements. The support grill 54 receives and supports a convoluted heating element 60 which, upon the application thereto of electrical energy, provides heat (indicated by arrows 62 in FIG. 2) for warming, heating, roasting, smoking or cooking, e.g. meat residing on the grill 48. The drip pan 56 is made of a suitable meat reflective material, for example, aluminum or aluminum alloy, so as to reflect heat provided by the heating element 60, and in addition, the drip pan catches any dripping fat and provides a fast burn-off of the fat. The support grill and assembly 52 are supported at a predetermined height below the grill 48, for example, by a plurality of bosses 66 formed at predetermined points along the base walls 42—42 and at a predetermined height below the bosses 50—50; thus the heating element is in turn supported a predetermined distance below the grill 48.

The support grill 54 may also support suitable heat impounding material for retaining heat emitted by the heating element 60, such as for example, permanent lava rock or ceramic type material.

Figure 4:
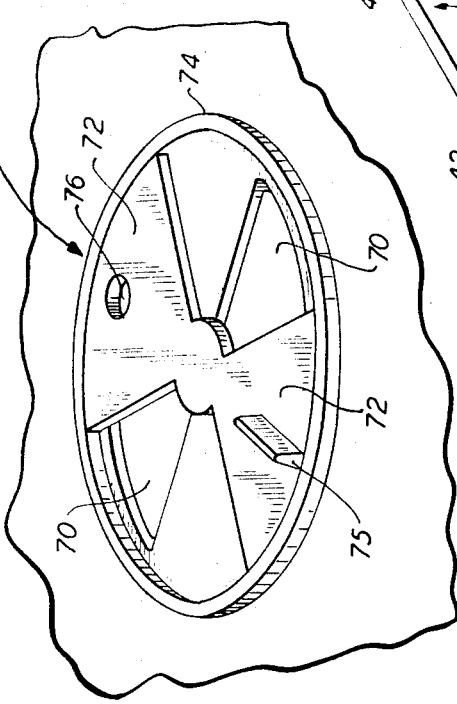
FIG. 4 is a partial, enlarged view of the adjustable vent formed in the top of the food preparation unit of the present invention.

An adjustable vent 34, best seen in FIG. 4, is formed in the cover top 46. A pair of sector-shaped apertures 70—70 are formed in the cover top 46 and a pair of integrally formed sector-shaped members 72—72 are suitably mounted rotatably on the cover top 46 and retained rotatably within a retaining ring 74 suitably secured to the cover top 46. The sector-shaped members 72—72 are provided with a projection 75 manually engageable to provide rotation to the members 72—72 to vary the exposure of the apertures 70—70 and thereby vary the vent opening and control escape air flow 22 and hence provide the controlled escape of steam and smoke from the unit 20. An aperture 76 is formed in the sector-shaped members 72—72 to assure that there is always an escape for any excess steam and smoke from the unit particularly when the adjustable vent is closed thereby providing a highly desirable feature which prevents possible burns to an attendant or operator who might unsuspectingly open the cover upon the unknown accumulation of steam in the unit were the permanent aperture 76 not provided.

For convenience of opening and closing of the food preparation unit 20, the cover 32 may be provided with a handle 80 suitably secured to the front wall 44 of the cover 32 such as by threaded fasteners. The handle may be air-cooled by having hollow spaces formed on the interior portion thereof for the accommodation of circulating and cooling air.

An electrical control unit 82, electrically interconnected to the heating element 60, is suitably secured to an end wall 42 of the base 30 such as by threaded fasteners. The electrical control unit may be any one of several known to the art, or may be advantageously the control unit shown in FIGS. 6A and B, which unit is for being connected to a source of electrical energy and for providing variable amounts of electrical energy to the heating element 60, for example, under the control of a rotatable dial 84.

Figure 6A:
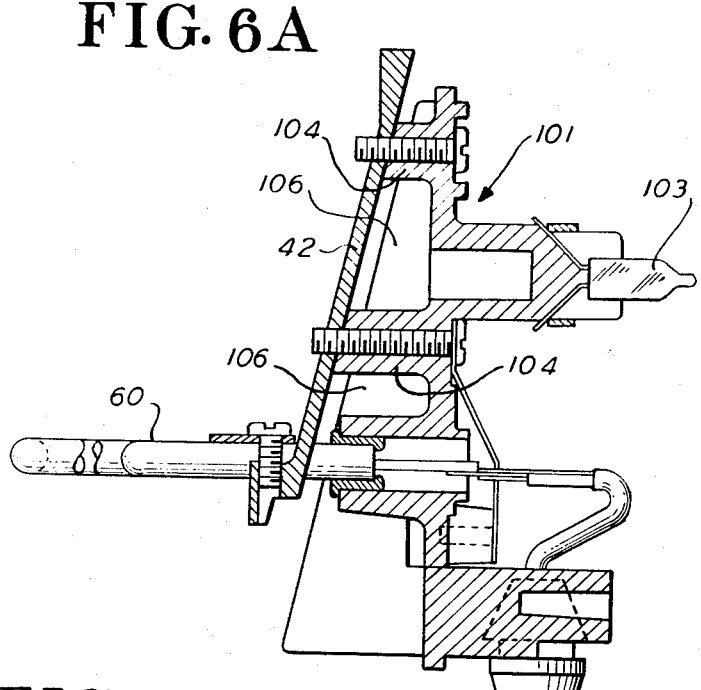
FIGS. 6A and B is a split view showing the two major components of the electrical control box of the present invention.
Figure 6B:
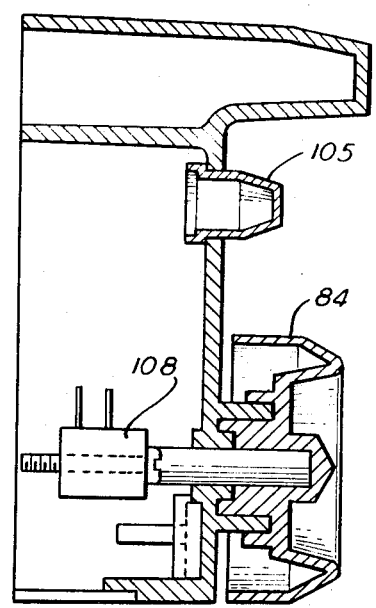

Referring now to FIGS. 6A and B, the control box 82 may be the multi-part control box including the two major sub-component parts 101 and 102 which may be made from an insulating, high temperature resistant plastic, e.g. a mineral filled phenolic. The control part 101 may be suitably secured to the base wall 42 by threaded fasteners, as shown, which extend through a plurality of spacer members 104 which are spaced apart or shown in the vertical as shown and which are similarly spaced apart in the horizontal to provide open spaces 106 for air to flow and circulate between the control box 82 and the food preparation unit wall 42. The spacers provide thermal insulation between the control box and the food preparation unit which provides more accurate control of the electrical energy supplied by the control box to the heating element thereby providing more accurate and true control of the temperature of the heating element with regard to a given setting of the control box dial 84. Upon assembly, the sub-component 102 is fitted over the sub-component 101 and may be secured thereto by suitable threaded fasteners sufficiently tightly to make the control box water-proof permitting outside use of the food preparation unit. During such assembly, the heat control unit 108 is mechanically and electrically interconnected to the power cord 110 in a manner known to those skilled in the art; and the power cord is for being connected to a suitable source of electrical energy. Rotation of the dial 84 varies, through the heat control unit 108, the amount of electrical energy supplied to the heating element 60. The control box may be provided with a pilot light 103 and cooperating lens cap 105 for providing a visible indication of the operating state of the food preparation unit.

For convenience of lifting and carrying, and as shown in FIG. 3, the food preparation unit may be provided with a handle 88 suitably secured to one end wall 42 of the base for example by threaded fasteners; and the electrical control unit 82 may be provided with a handle portion 90.

As shown in FIG. 3, a plurality of legs 92—92 may be suitably secured to the bottom 24 of the base 30, such as by threaded fasteners, supporting the food preparation unit 20 a predetermined distance above the surface on which the grill may be residing to assure the intake flow of ambient air 22 into the aperture 26 formed in the bottom 24. However, if the base 30 of the food preparation unit 20 is supported by other support means which exposes the aperture 26 to the ambient air, the legs 92—92 are not required.

Figure 7:
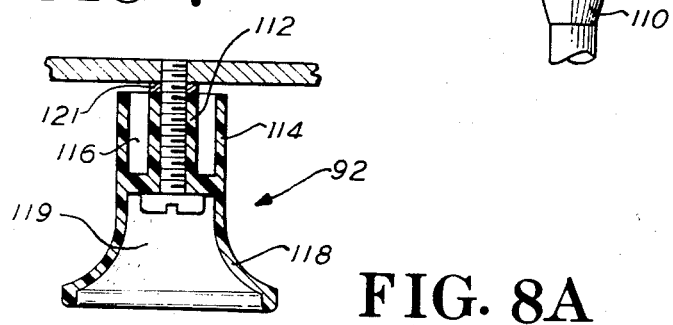
FIG. 7 is a sectional view of an air-cooled support leg of the present invention.

Referring now to FIG. 7, there is shown a detail of an air-cooled leg 92, a plurality of which may be advantageously utilized to support the food preparation unit 20 with respect to a surface on which the unit resides, such as for example, a table top or a table top covered with a table cloth. The leg is provided with an upper, inner annular portion 112 of a predetermined height for engaging the bottom of said base as shown, and an upper, outer annular portion 114 of a predetermined height less than said upper, inner annular portion and spaced therefrom and thereby providing an annular space 116 therebetween for the circulation of air, and further including a generally annular, outwardly flared lower portion 118 having a hollow interior for the receiving of air; said upper, inner annular portion having a longitudinal opening formed therein for receiving a threaded fastener for securing said leg to said base as shown. The lower, outwardly flared annular portion 118 provides a minimum bearing or contact surface with the surface on which the food preparation unit resides thereby providing minimum thermal connection to such surface. Air circulating and residing in the annular space 116 and hollow space 120, respectively, provide thermal insulation between the bottom of the food preparation unit base 24 and thereby maintain the base cool with respect to the surface on which the unit resides to prevent burning, charring or unwanted and undesirable heating of such surface. The leg 92 may be made advantageously of thermal insulating material such as a mineral filled phenolic, and the leg may be provided advantageously with a washer 121 of a higher, temperature thermal insulating material such as a high temperature Nylon such as the DuPont NOMEX; the thermal insulating material of which the leg 92 is made being less of a heat conductor than the material of which the bottom 24 of the food preparation unit is made, and the washer 121 being made of a material which is less of a heat conductor than the material of which the leg 92 is made.

Figure 8A:
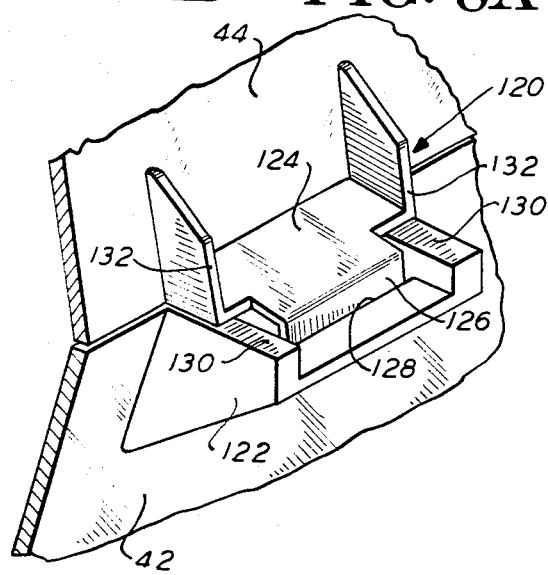
FIGS. 8A and B are views of the hinge of the present invention for hinging the cover and base of the food preparation unit.
Figure 8B:
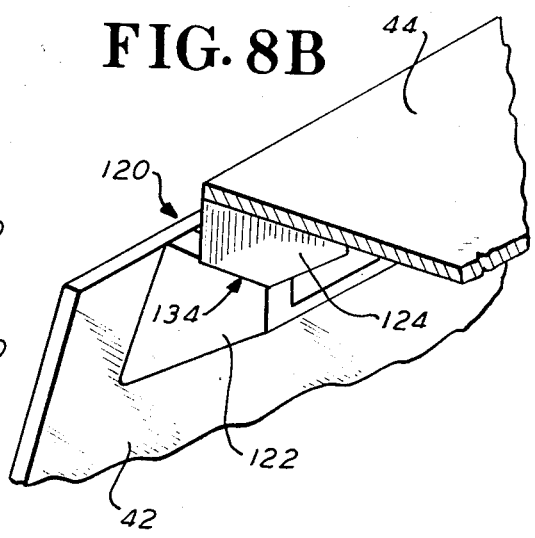

With regard to the hinge means 47 of FIG. 3, such hinge means may be advantageously the hinge 120 of FIGS. 8A and B which provides limited pivotal movement to the cover 32 with respect to the base 30 and which prevents toppling of the unit 20 upon the unattended opening of the cover. The hinge 120 includes a lower portion 122 suitably, fixedly secured to the back wall 42 of the base 30, and an upper portion 124 similarly secured to the back wall 42 of the cover 32. The upper portion is provided with an outwardly and downwardly distending portion 126 which is received loosely within an elongated opening 128 formed in the lower portion 122; such loose receipt permits rotation of the upper portion 124 with respect to the lower portion 126 thereby permitting pivotal movement for the cover 32 with respect to the base 30 for opening of the food preparation unit 20. For preventing possible toppling of the unit 20 upon the opening of the cover 32 and the leaving of the cover unattended, the lower hinge portion 122 is provided with surfaces 130 and the upper hinge portion 124 is provided with surfaces 132 which, upon opening of the cover 32, engage and abut as shown at 134 in FIG. 8B thereby providing limited pivotal movement of the cover 32 with respect to the base 30 so as to maintain the cover 32 in a predetermined upright position upon the cover being opened and left unattended.

The base 30 and cover 32 may be, for example, cast of a suitable metal such as aluminum or an aluminum alloy. It has been found that aluminum is particularly satisfactory and gives highly desirable results in that the shiney and heat reflective interior of an aluminum cast base and cover provides reflected heat and hence, unlike many prior art grills, no rotisserie is needed. Further, the base and cover may be provided with a suitable coating of high temperature resistant paint for an attractive and desirable decorative effect.

It will be understood that many modifications may be made in the present invention without departing from the spirit and scope thereof.

What is claimed is:

1. A food preparation unit, comprising:
   a base provided with a contoured bottom having an aperture formed therein;
   a cover provided with a contoured top and being pivotally secured to said base;
   a support grill;
   means provided on said base for supporting said support grill at a predetermined height;
   an electric heating element for being connected to a source of electrical energy;
   means for supporting said electric heating element at a predetermined distance with respect to said support grill;
   an adjustable vent formed in said contoured cover top, said adjustable vent having an aperture formed therein to assure that there is always an escape for excess steam and smoke from said food preparation unit, and said adjustable vent for providing a variable sized opening to provide the controlled escape of steam or smoke from said unit;
   upon electrical energy being supplied to said heating element, ambient air being drawn into said aperture formed in said base and said air flowing upwardly through said unit and out said vent thereby purging said food preparation unit of smoke present therein and maintaining said base cool with respect to said heating element.

2. A food preparation unit according to claim 1, further including heat reflecting means for reflecting heat provided by said heating element toward said support grill, and further including means provided on said base for supporting said heat reflecting means at a predetermined distance with respect to said heating element.

3. A food preparation unit, comprising:
   a base provided with a contoured bottom having an aperture formed therein;
   a cover;
   hinge means interconnecting said base and cover and providing pivoting of said cover with respect to said base thereby permitting opening and closing of said unit;
   a food receiving grill;

means provided on said base for receiving and supporting said food receiving grill at a predetermined height;

an electric heating element for being connected to a source of electrical energy;

a support grill and drip pan assembly, said drip pan being made of heat reflecting material to reflect heat provided by said heating element toward said food receiving grill and for catching fat dripping from said food receiving grill and providing fast burn-off of said fat, and said support grill for receiving and supporting said electric heating element and for receiving and supporting charcoal;

means provided on said base for receiving and supporting said support grill and drip pan assembly at a predetermined distance below said food receiving grill and thereby supporting said heating element at a predetermined distance below said food receiving grill;

an adjustable vent formed in said cover; said adjustable vent having an aperture formed therein to assure that there is always an escape for excess steam or smoke from said food preparation unit, and said adjustable vent for providing a variable sized opening to provide the controlled escape of steam or smoke from said unit;

upon said food preparation unit being closed and upon electrical energy being supplied to said heating element to heat said element, ambient air being drawn into said aperture formed in said base and said air flowing in a laminar manner along the interior of said base and along said cover and out said vent thereby purging said food preparation unit of smoke present therein and maintaining said base cool with respect to said heating element.

4. A food preparation unit according to claim 3 further including variable electrical energy control means secured to said base and interconnected intermediate said heating element and said source of electrical energy and for providing variable control of said heat provided by said element.

5. A food preparation unit according to claim 4 wherein said variable electrical energy control means comprises a multi-part control box of mineral filled phenolic material and having a plurality of spaced apart spacer members for engaging said food preparation unit base and providing open space areas therebetween to permit a flow of air between said control box and said base so as to maintain said control box cool with respect to said base.

6. A food preparation unit according to claim 3 wherein said hinge means are provided with predetermined cooperating surfaces which engage and abut upon said pivoting of said cover with respect to said base thereby limiting the degree of allowable pivotal movement of said cover with respect to said base so as to preclude toppling of said unit upon the unattended opening of said cover.

7. A food preparation unit according to claim 3 further including a plurality of air-cooled legs secured to said base and for supporting said unit with respect to any surface on which said unit resides, said air-cooled legs for maintaining said base cool with respect to said surface on which said unit resides.

8. A food preparation unit, comprising:

a base including four walls inclined at a predetermined angle with respect to the vertical and a contoured bottom formed integrally with said walls, said bottom having an aperture formed centrally thereof for providing a drain for any fat present on said contoured bottom and an air intake for ambient air;

a cover including four walls inclined at a predetermined angle with respect to the vertical and a top formed integrally with said walls;

hinge means interconnecting said base and cover and providing pivoting of said cover with respect to said base thereby permitting opening and closing of said grill;

a food receiving grill;

a first plurality of bosses formed at predetermined points around said walls of said base and at a predetermined height with respect to said bottom of said base, said first plurality of bosses for receiving said food receiving grill and supporting said food receiving grill at a predetermined height with respect to said bottom of said base;

a convoluted electric heating element for being connected to a source of electrical energy;

a support grill and drip pan assembly, said drip pan being made of heat reflecting material to reflect heat provided by said heating element toward said food receiving grill and for catching any fat dripping from said food receiving grill and providing fast burn-off of said fat, and said support grill for receiving and supporting said electric heating element and for receiving and supporting charcoal;

a second plurality of bosses formed at predetermined points around the walls of said base and at a predetermined height with respect to said bottom of said base and lower than said predetermined height of said first plurality of bosses, said support plurality of bosses for receiving and supporting said support grill and drip pan assembly at a predetermined height with respect to said food receiving grill and thereby supporting said heating element at a predetermined distance with respect to said food receiving grill, said second plurality of bosses also for supporting said support grill and drip pan assembly spaced a predetermined distance from said walls of said bottom to permit air flow between the outer edges of said support grill and drip pan assembly and said walls of said bottom;

an adjustable vent formed in said top of said cover substantially centrally thereof, said adjustable vent having an aperture formed therein to assure that there is always an escape for any excess steam and smoke present in said food preparation unit, and said adjustable vent for providing a variable sized opening to permit the controlled escape of any steam or smoke present in said food preparation unit;

upon said food preparation unit being closed and upon electrical energy being supplied to said heating element to heat said element, ambient air being drawn into said aperture formed in said bottom of said base and said air flowing laminarily along said substantially contoured bottom of said base, along the inclined walls of said bottom and between said space between said outer edges of said support grill and drip pan assembly and said walls of said bottom, along said inclined walls of said cover, and along said top of said cover and out said vent thereby purging said food preparation unit of any smoke present therein and maintaining said bottom of said base cool with respect to said heating element; and support means provided on said concave bottom of said base and for supporting said food preparation unit at a predetermined height with respect to any surface on which said food preparation unit resides to permit said ambient air to be drawn into said aperture formed in said bottom of said base.

9. A food preparation unit according to claim 3 further including variable electrical energy control means secured to one of said walls of said base and interconnected intermediate said heating element and said source of electrical energy and for providing variable control of said heat of said heating element.

10. A food preparation unit according to claim 8 wherein said variable electrical energy control means comprises a multi-part control box of mineral filled phenolic material and having a plurality of spaced apart spacer members for engaging a predetermined wall of said food preparation unit base and providing open space areas therebetween to permit a flow of air between said control box and said base so as to maintain said control box cool with respect to said base.

11. A food preparation unit according to claim 8 wherein said support means comprises a plurality of air-cooled legs of a predetermined height secured to said contoured bottom of said base and for maintaining said base cool with respect to said surface on which said food preparation unit resides; each of said legs including an upper, inner annular portion of a predetermined height for engaging the bottom of said base and an upper, outer annular portion of a predetermined height less than said upper, inner annular portion and spaced therefrom and thereby providing an annular space for the circulation of air, and further including a generally annular, outwardly flared lower portion having a hollow interior for the circulation of air; said upper, inner annular portion having a longitudinal opening formed therein for receiving a threaded fastener for securing said leg to said base.

12. A food preparation unit according to claim 8 wherein said hinge means are provided with predetermined cooperating surfaces which engage and abut upon said pivoting of said cover with respect to said base thereby limiting the degree of allowable pivotal movement of said cover with respect to said base so as to preclude toppling of said unit upon the unattended opening of said cover.

13. A food preparation unit according to claim 8 further including a plurality of air-cooled legs secured to said base and for supporting said unit with respect to any surface on which said unit resides, said air-cooled legs for maintaining said base cool with respect to said surface on which said unit resides, each of said legs including an upper, inner annular portion of a predetermined height for engaging the bottom of said base and an upper, outer annular portion of a predetermined height less than said upper, inner annular portion and spaced therefrom and thereby providing an annular space for the circulation of air, and further including a generally annular, outwardly flared lower portion having a hollow interior for the circulation of air, said upper, inner annular portion having longitudinal opening formed therein for receiving a threaded fastener for securing said leg to said base; and said leg being made of a high temperature Nylon material.

* * * * *